US008036811B2

(12) United States Patent
De Fazio et al.

(10) Patent No.: US 8,036,811 B2

(45) Date of Patent: Oct. 11, 2011

(54) METHOD FOR EVALUATING THE QUANTITY OF FUEL INJECTED BY A FUEL INJECTOR IN AN INTERNAL COMBUSTION ENGINE, PARTICULARLY A DIESEL COMMON-RAIL ENGINE

(75) Inventors: Tommaso De Fazio, Bologna (IT); Michele Bastianelli, Camerano (IT); Giovanni Rovatti, Chieri (IT)

(73) Assignee: GM Global Technology Operations LLC, Detroit, MI (US)

( * ) Notice: Subject to any disclaimer, the term of this patent is extended or adjusted under 35 U.S.C. 154(b) by 390 days.

(21) Appl. No.: 12/360,661

(22) Filed: Jan. 27, 2009

(65) Prior Publication Data

US 2009/0192696 A1 Jul. 30, 2009

(30) Foreign Application Priority Data

Jan. 28, 2008 (EP) .................................... 08425038

(51) Int. Cl.
*F02D 41/00* (2006.01)
*G01M 15/04* (2006.01)

(52) U.S. Cl. ...................................................... 701/103

(58) Field of Classification Search .......... 701/103–105, 701/115; 123/472; 73/114.48
See application file for complete search history.

(56) References Cited

U.S. PATENT DOCUMENTS

| | | | | | |
|---|---|---|---|---|---|
| 3,990,422 | A | * | 11/1976 | Watson et al. | 123/472 |
| 4,068,640 | A | * | 1/1978 | Watson et al. | 123/450 |
| 6,021,758 | A | | 2/2000 | Carey et al. | |
| 2002/0148441 | A1 | | 10/2002 | Tuken | |

FOREIGN PATENT DOCUMENTS

| | | | | |
|---|---|---|---|---|
| GB | 2463022 | A | * | 3/2010 |

* cited by examiner

*Primary Examiner* — Hieu T Vo

(74) *Attorney, Agent, or Firm* — Ingrassia Fisher & Lorenz, P.C.

(57) ABSTRACT

A method is provided that includes, but is not limited to acquiring the crankshaft speed signal while one fuel injector is energized for a determined period of time (ET) in which all the other fuel injectors are de-energized, processing the acquired crankshaft speed signal so as to obtain signals or data (A) representative of the amplitude of a predetermined harmonic component of the crankshaft speed signal, and calculating the power (RMS/MS) of said harmonic component, and assuming the calculated power value (C) as an estimation of the quantity of fuel actually injected by the energized injector in said predetermined period of time (ET).

16 Claims, 4 Drawing Sheets

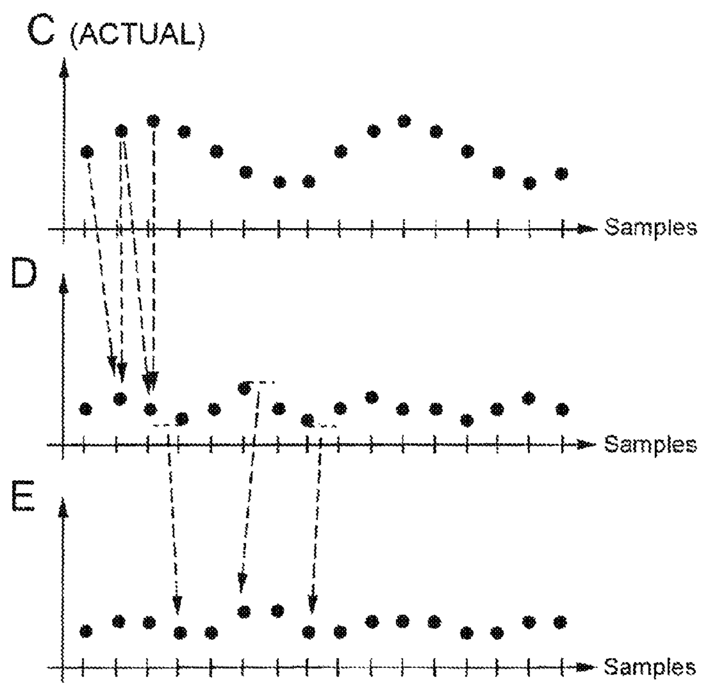
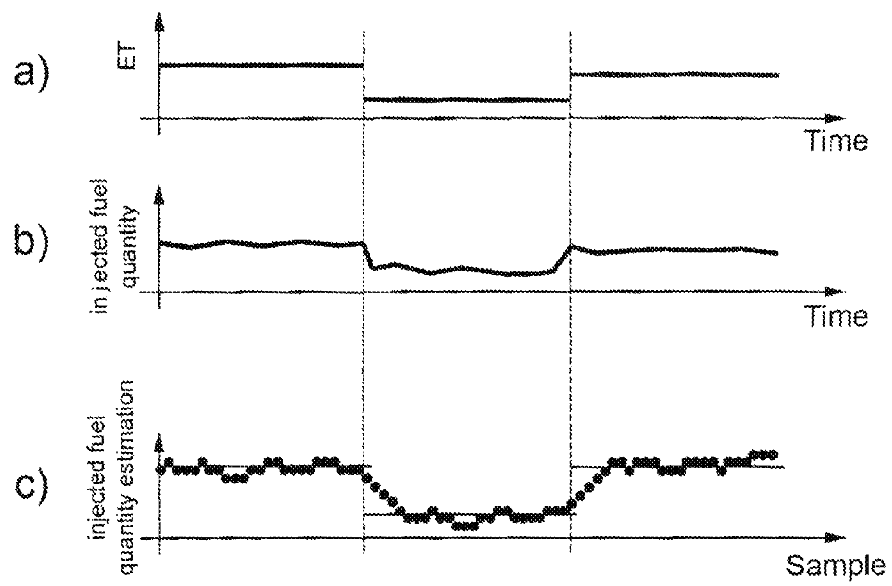
FIG.10

METHOD FOR EVALUATING THE QUANTITY OF FUEL INJECTED BY A FUEL INJECTOR IN AN INTERNAL COMBUSTION ENGINE, PARTICULARLY A DIESEL COMMON-RAIL ENGINE

CROSS-REFERENCE TO RELATED APPLICATION

This application claims priority to European Patent Application No. EP 08425038.0-2311, filed Jan. 28, 2008, which is incorporated herein by reference in its entirety.

TECHNICAL FIELD

The present invention refers to fuel injection in internal combustion engines, particularly diesel common-rail engines for motor-vehicles. More specifically, the present invention relates to a method for evaluating the quantity of fuel which by means of an electrically controlled fuel injector is actually injected into the corresponding cylinder of an internal combustion engine which includes a crankshaft with associated detector means for providing a signal representative of the crankshaft speed.

BACKGROUND

In order to improve the characteristics of exhaust emissions and reduce combustion noise in engines, particularly diesel engines having a common-rail fuel injection system, a so-called multiple fuel injection pattern is adopted, according to which the fuel quantity to be injected in each cylinder at each engine cycle is split into a plurality of sub-injections. Thus, a typical multiple injection pattern may include a preliminary or pilot injection, which may be in turn split into two or more injection pulses, followed by a so-called main injection pulse, followed by a number of final injection pulses.

The pilot injection pulses have an effect both on the level of combustion noise and exhaust emissions, and their duration or energizing time (ET) is generally mapped in memories of the electronic injection control unit. The mapped values of the energizing time are predetermined with reference to an injection system having nominal characteristics (i.e., components having no drifts).

However, the fuel quantity which is actually injected by an injector into the corresponding engine cylinder is inevitably affected by drifts, with respect to the desired or nominal value and this, during the vehicle lifetime causes a variation of the combustion noise and exhaust emission characteristics.

Generally speaking, drifts of the injected fuel quantity may be caused by drifts of the injectors' characteristics, drifts of the rail-pressure sensors, drifts of the injector back-flow pressure, etc.

Among the above-mentioned causes of inaccuracy of the injected fuel quantity, the most critical one is represented by drifts of the injector characteristics. With the present injector manufacturing technologies, the fuel quantity actually injected in each cylinder for each engine cycle can be different from the desired (nominal) fuel quantity. The main reasons for this are the inevitable spread of the characteristics of the fuel injectors due to production tolerances and, subsequently, due to aging of the injection system.

As a result of production tolerances and their variations with aging, for a given energizing time at a given fuel-rail pressure, the actually injected fuel quantity can be different injector by injector.

The problem of a precise determination of the actually injected fuel quantity is particularly critical for small fuel quantities, for which a good precision and a high repeatability is necessary in order to achieve lower emissions and a reduced combustion noise.

US-2002/148441-A discloses a method for obtaining diagnostic information from instantaneous engine speed measurements and U.S. Pat. No. 6,021,758 A discloses a method for engine cylinder balancing using an engine speed signal.

As it will become apparent from the following description, the present invention is basically based on processing an engine speed signal, in order to achieve a reliable estimation of the quantity of fuel actually injected by each injector. Accordingly, it is desirable to improve the processing of an engine speed signal, in order to achieve a reliable estimation of the quantity of fuel actually injected by each injector. In addition, other desirable features and characteristics will become apparent from the subsequent detailed description, and the appended claims, taken in conjunction with the accompanying drawings and this background.

SUMMARY

In accordance with an embodiment of the invention, a method comprises the steps of acquiring the crankshaft or engine speed signal while a fuel injector is energized for a determined period of time in which all other fuel injectors are de-energized, processing the acquired crankshaft speed signal so as to obtain signals or data representative of the amplitude of a predetermined harmonic component of the crankshaft speed signal, and calculating the power (e.g., root mean square) value of the harmonic component, and assuming the calculated power value as an estimation of the quantity of fuel actually injected by said injector in said predetermined period of time. With a four-stroke internal combustion engine, the above-mentioned harmonic component is the component of order about 0.5.

The embodiments of the invention also provide a method for controlling the injectors of an internal combustion engine, particularly a diesel common-rail engine for motor-vehicles, that comprises the steps of evaluating the quantity of fuel actually injected by each fuel injector in accordance with the foregoing method embodiment, and controlling the energizing time of the injectors in dependence (also) on the thus obtained estimations of the quantity of the fuel actually injected by each injector.

BRIEF DESCRIPTION OF THE DRAWINGS

The present invention will hereinafter be described in conjunction with the following drawing figures, wherein like numerals denote like elements, and:

FIG. 7*a* and FIG. 7*b* are graphs which in the digital time domain represent the root mean square sample values, in an ideal and in actual situation, respectively;

FIG. 8 and FIG. 9 are graphs showing the samples obtained by submitting the samples of FIG. 7*b* to a sample by sample low-pass filtering and a subsequent amplitude low-pass filtering; and FIG. 10*a*, FIG. 10*b*, and FIG. 10*c* are graphs showing, as a function of time, variations of the energizing time ET of an injector, the corresponding variation of the injected fuel quantity, and the injected fuel quantity estimations obtained by the method of the present invention, respectively.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
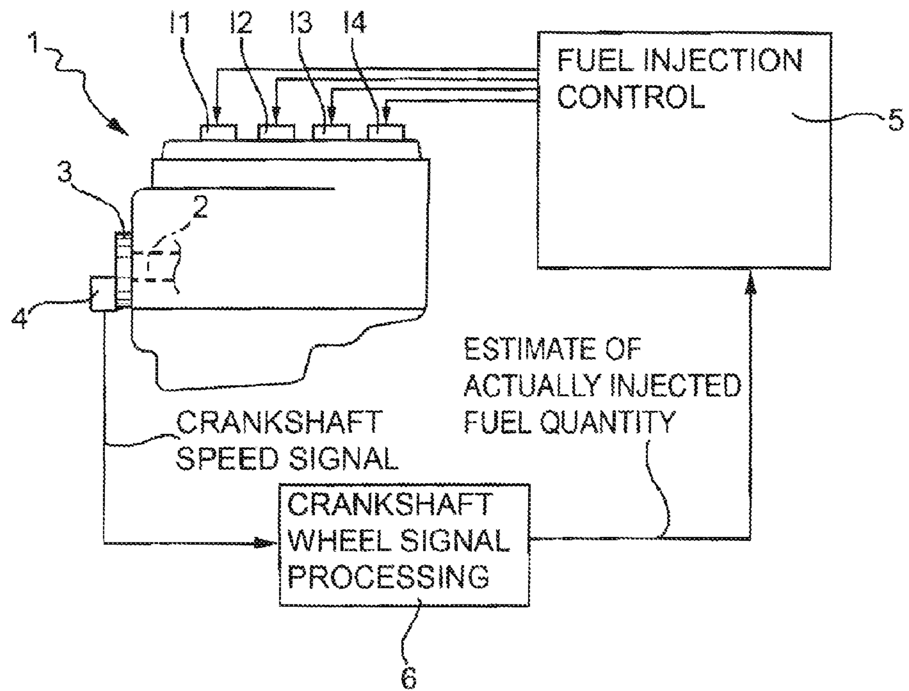
FIG. 1 is a block-diagram representation of a method according to an embodiment of the present invention.

In FIG. 1 of the annexed drawings 1 indicates an internal combustion engine, particularly a Diesel common-rail engine for use for instance in a motor-vehicle. The engine 1 is in particular a four-stroke engine, which in the exemplary embodiment shown has four cylinders, to which respective electrically-controlled fuel injectors, for instance solenoid-operated injectors I1-I4 are associated. In a per se known manner the engine 1 comprises a crankshaft 2 to which a toothed wheel 3 is fixed. The wheel 3 has for example 60 angularly equi-spaced teeth, and a pick-up device 4 is coupled thereto for providing a crankshaft or engine speed signal. The fuel injectors I1-I4 are suitably driven by a fuel injection control 5.

In a system according to an embodiment the present invention, the crankshaft speed signal provided by the sensor or detector 4 is acquired and processed in a predetermined manner as represented by a block 6 in FIG. 1, to provide an estimation of the fuel quantity actually injected by each injector. This estimation can be conveniently used by the fuel injection control 5 for modifying the energizing times of the injectors I1-I4 so as to compensate the initially discussed effects of drifts and tolerances in the fuel injection system.

In a reciprocating internal combustion engine, the gas-pressure torque in each cylinder is a periodic function, due to the characteristics of the thermodynamic cycle. Thus, in a 4-stroke engine the gas-pressure torque has a period of 720° CA (Crankshaft Angle). In other words, if ω is the crankshaft revolution frequency, in a 4-stroke engine the gas-pressure torque has a frequency of about 0.5 ω.

The gas-pressure torque in a 4-stroke engine can be expressed by means of a Fourier series, including the frequency of about 0.5 ω as the fundamental frequency, and its harmonic frequencies of about 1.0 ω, 1.5 ω, 2.0 ω, 2.5 ω, 3.0 ω, etc.

The harmonic component whose frequency is 0.5 ω is defined as the component of order of about 0.5. As already stated above, this component has a period of about 720° CA and its frequency is the same as the camshaft revolution frequency. The harmonic component with frequency of about 1.0 ω is defined as the component of order about 1 and has a period of about 360° CA; its frequency equals the crankshaft revolution frequency. The harmonic component whose frequency is about 1.5 ω is defined as the component of order of 1.5 and has a period of about 240° CA. The harmonic component whose frequency is about 2.0 ω is the component of order of about 2 and has a period of about 180° CA; in a 4-cylinder engine this frequency is the same as the (stroke-by-stoke) injection frequency (one injection occurs about every 180° CA); in a 4-cylinder engine, this frequency and its multiples (e.g., 2.0 ω, 4.0 ω, 6.0 ω, etc.) are defined as the major harmonics or majors orders. The harmonic component whose frequency is about 3.0 ω is defined as the component of order about 3 and has a period of about 120° CA; in a 6-cylinder engine this frequency is the same as the (stroke-by-stroke) injection frequency (one injection occurs every about 1201° CA); in a 6-cylinder engine this frequency and its multiples (e.g., 3.0 ω, 6.0 ω, 9.0 ω, etc.) are defined as the major harmonics or major orders.

In the operation of an engine, the actually injected fuel quantity, particularly the fuel quantity injected in the pilot injection pulse(s), cannot be measured directly. The embodiments of present invention provide a method for achieving a good estimation of the actually injected fuel quantity.

The method of embodiments of the present invention comprises a first step in which the crankshaft speed signal provided by the sensor 4 is acquired while one predetermined fuel injector is energized for a predetermined period of time in which all the other fuel injectors are de-energized. This causes an unbalance to occur, and the effects thereof on the dynamics of the crankshaft wheel 3 are analyzed.

The method of embodiments of the present invention further includes a step of processing the acquired crankshaft speed signal, so as to obtain signals or data representative of the amplitude of a predetermined harmonic component of said speed signal. In particular, with a 4-stroke internal combustion engine the engine speed component of order about 0.5 is the one which has shown the best correlation to the actually injected fuel quantity, particularly the fuel quantity injected with the pilot injection pulse(s). This may be explained by taking into account that in the above-first mentioned step of the method only one injector is actually energized during about 720° CA.

In that first step of the method, as already mentioned above, an unbalance is caused and in order to detect the magnitude of that unbalance, one can analyze the harmonic components of the engine speed signal provided by means of the crankshaft wheel 3 and the associated detector 4. In particular, the engine speed harmonic components of order about 0.5 and multiples of about 0.5 are the best suited for the detection of the magnitude of the unbalance. In general, the analysis of the harmonic components should be focused on the orders of about 0.5, 1.0, 1.5, 2.0, . . . , Z/4 where Z is the number of cylinders of the engine.

When all the engine cylinders are rather balanced, the amplitudes of these harmonic components are rather small; if the cylinders are not balanced, the amplitudes of the harmonic components become quite large. The amplitudes of the engine speed components of order about 0.5 and multiples of about 0.5 can be used as a basis for evaluating the magnitude of the unbalance.

In particular the engine speed component of order about 0.5 has proved to be the one having the best correlation with the fuel quantity actually injected into one cylinder. This can be explained taking into account that during about 720° CA only one injector is energized.

Thus, as stated above, in the first step of the method of the embodiment of the invention, one single injector is energized, over about 720° CA (Crank Angle). The engine speed signal provided by the sensor 4 is then subjected to band-pass filtering, as shown by block 7 in FIG. 2.

The theory of band-pass filtering can be advantageously applied in order to evaluate the magnitude of the unbalance in the cylinder corresponding to the energized injector. All the calculations in the order domain are performed with a band-pass filter having the following standard difference-equation implementation:

$$a_1 y(n)=b_1 x(n)+\ldots+b_{nb+1}x(n-nb)-a_2 y(n-1)-\ldots-a_{na+1}y(n-na)$$

Figure 3:
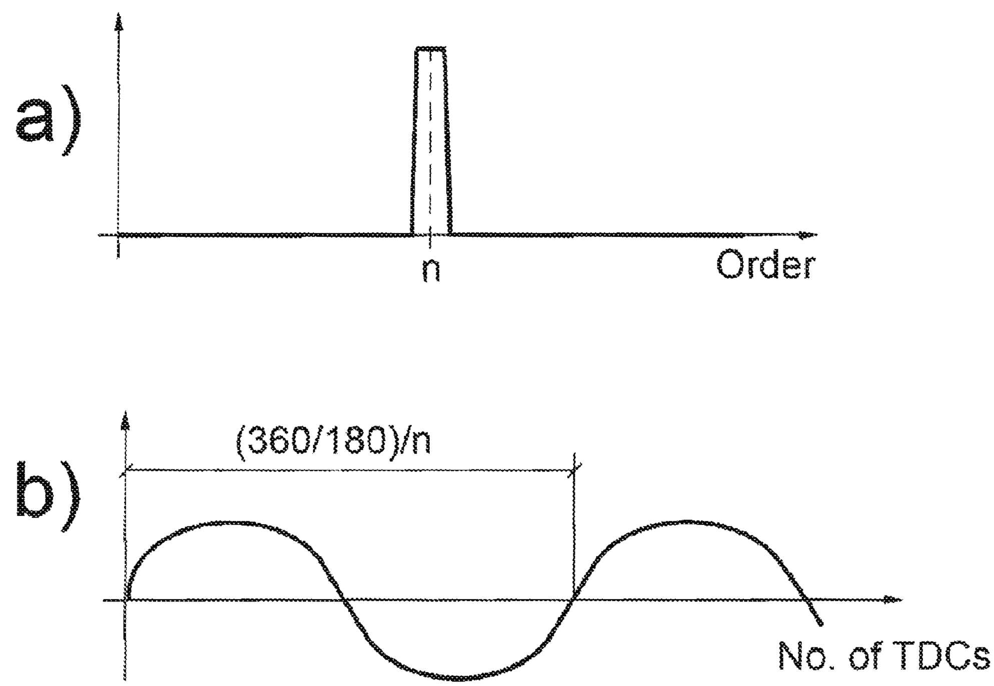
FIG. 3*a* and FIG. 3*b* are diagrams showing the characteristics of a band-pass filter in the frequency domain and in the time domain, respectively.

A band-pass filter is a filter which passes frequencies within a certain range and rejects (attenuates) frequencies outside that range. A typical band-pass characteristic in the frequency or order domain is shown in the qualitative graph of FIG. 3*a*, showing a pass-band around a harmonic component of order n. The output of a band-pass filter in the time domain is (ideally) a sinusoid as shown in the graph of FIG. 3*b*.

Figure 4:
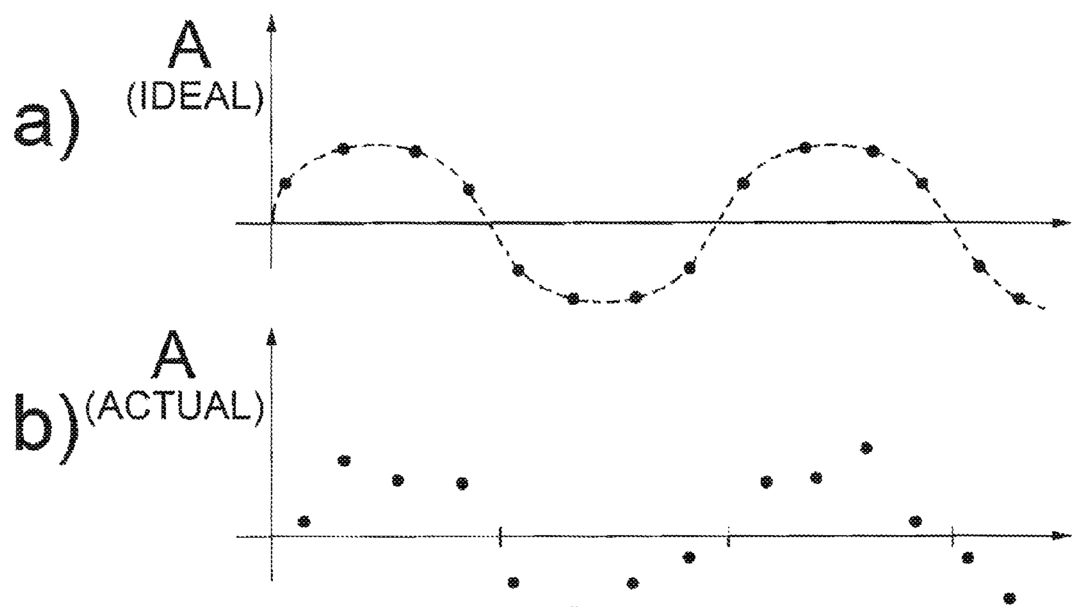
FIG. 4*a* and FIG. 4*b* are qualitative representations of the samples obtained by band-pass filtering the engine speed signal, in an ideal and in an actual situation, respectively.

In a motor-vehicle the crankshaft wheel speed signal does not only reflect the dynamics of the engine, but is instead also affected by some noise due to the roughness and irregularities of the road. Thus, while ideally the output A (FIG. 2) from the band-pass filter should comprise samples of a sinusoid (as shown in the graph of FIG. 4*a*, because of noise, the actual output A from the band-pass filter 7 appears instead as qualitatively shown in the graph of FIG. 4*b*.

Figure 2:
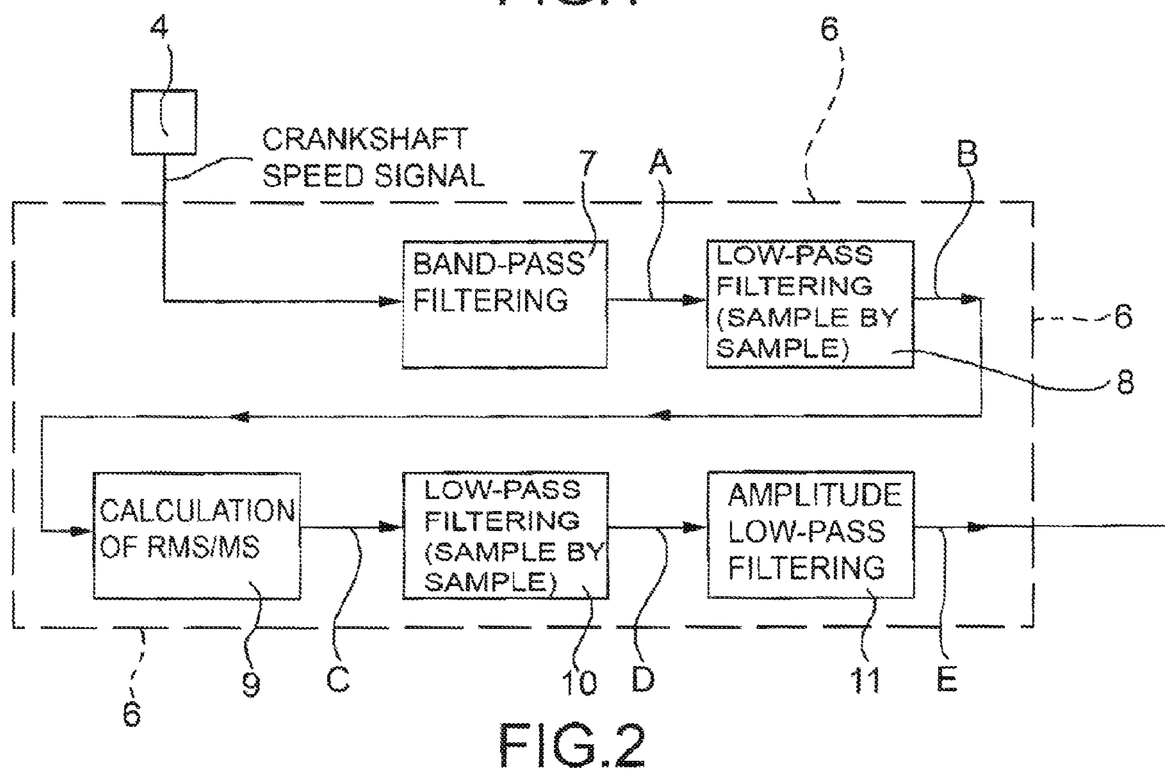
FIG. 2 is a block-diagram illustrating the engine speed signal processing in a method according to an embodiment of the invention.
Figure 5:
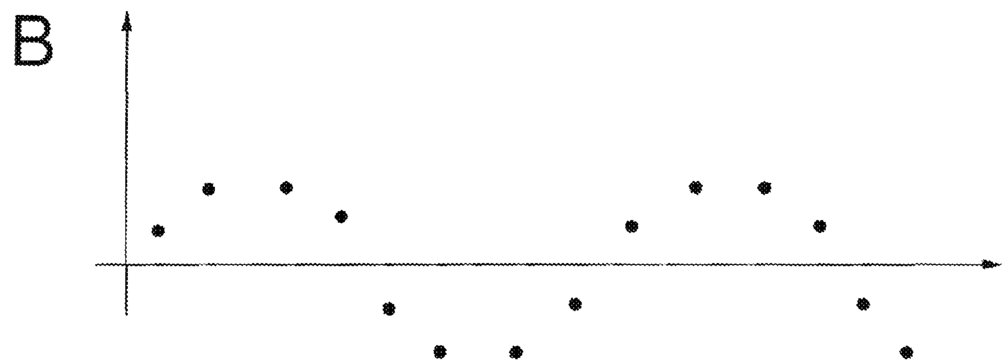
FIG. 5 is a graph qualitatively illustrating the samples obtained by suitably low-pass filtering the samples of FIG. 4*b*.
Figure 6:
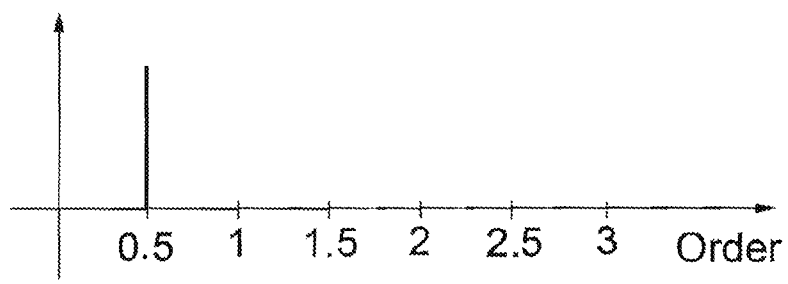
FIG. 6 is a graph showing a spectral line representing the amplitude of the harmonic component of order about 0.5 of the engine or crankshaft speed.

In order to eliminate the effect of the above-mentioned kind of noise, the output A from the band-pass filter 7 is subjected to a low-pass filtering treatment, sample-by-sample, as indicated by block 8 in FIG. 2, so as to provide an output B having the appearance shown in the graph of FIG. 5, i.e. more or less the ideal output A as expected from the band-pass filter 7 in the absence of road noise. Referring to the low-pass filtering, if generally speaking the treatment is performed on the harmonic component of order n, then the samples that are filtered are spaced by 360/n degrees or (360/180)/n TDCs, as represented in FIG. 3*b*.

The outcome B from the low-pass filtering stage 8 is subjected to the calculation of the root mean square (RMS) value, as shown by block 9 in FIG. 2. The root mean square or RMS value, also known as the quadratic means value, is a measure of the magnitude of a varying quantity. The RMS value of a function is often used in physics and electronics, for instance for calculating the power dissipated by an electrical conductor, or calculating the power of an alternating current.

In connection with a periodic function v(t) of time t, the RMS value $v_{RMS}$ can be defined as follows:

$$v_{RMS}=\sqrt{\frac{1}{T}\int_o^T v^2(t)\,dt}$$

Where T is the period of the function v(t).

If v(t) is a sinusoidal function of time t, one obtains $$v(t)-A\cos(2\pi f_c t)$$

and $$v_{RMS}=\sqrt{\frac{1}{T}\int_o^T A^2\cos^2(2\pi f_c t)dt}=A\big/\sqrt{2}$$

As shown by the above relationship, in the ideal domain the RMS value of a periodic function is a constant.

Reverting now specifically to an embodiment of the invention, the method provides for computing the RMS value in the discrete domain for the output B of the low pass-filtering stage 8. For a given collection of n values $\{x_1, x_2, \ldots, x_n\}$ the RMS value is $$x_{RMS}=\sqrt{\frac{1}{n}\sum_{i=1}^{n}x_i^2}=\sqrt{\frac{x_1^2+x_2^2+\ldots x_n^2}{n}}$$

The use of the RMS value is somehow related to Parseval's theorem. The theorem states that the power calculated in the time domain is the same as the power calculated in the frequency domain.

The calculation of the RMS value of the outcome of the low-pass filtering stage 8 thus allows obtaining the value of the power of the harmonic component of order about 0.5 of the engine speed. That power value is representative of the actually injected fuel quantity.

As stated above, in the ideal domain the computation of the RMS value of the output of the band-pass filter is a constant. Ideally, the actually injected fuel quantity corresponds to the power of the harmonic component of order about 0.5, and this, in the ideal case, is a constant. In general, the calculation of the RMS value can be replaced with the calculation of the MS value (Mean Square). The calculation of the MS value does not appreciably affect the result, but is computationally "lighter" to perform in an engine control unit.

An ideal pass-band filter has an exactly flat pass-band, and rejects all frequencies outside the pass-band. Furthermore, the transitions, from the pass-band to the outside frequencies are ideally "vertical". However, in practice, no band-pass filter is ideal. An actual band-pass filter does not completely attenuate all the frequencies falling outside the desired pass-band: in particular, there are adjoining regions outside the pass-band in which the frequencies are attenuated, but not rejected. As a consequence, the output from the band-pass filtering stage 7 of FIG. 2 contains also contributions that are not strictly related to the actually injected fuel quantity.

Figure 7A:
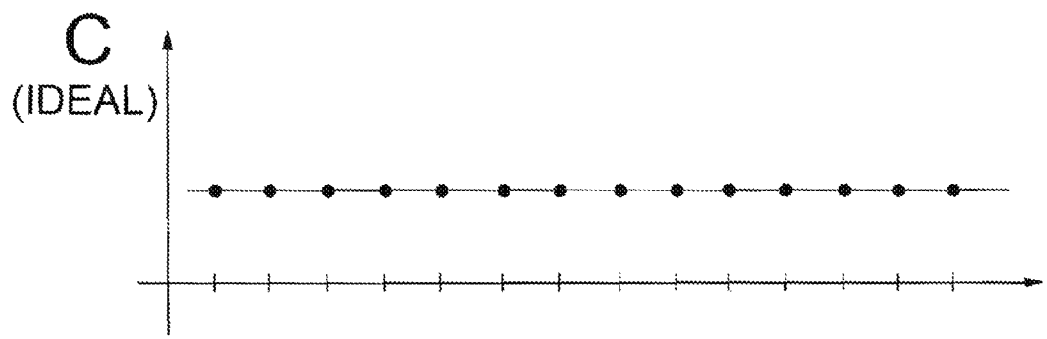

Thus, while in an ideal case the output C of the RMS/MS calculation stage 9 would be such as that qualitatively shown in the graph of FIG. 7*a*, due to the resonance dynamics (typically in the range from about 3 to 5 Hz) of the driveline of the motor-vehicle, the actual output C of said stage is such as that shown in the graph of FIG. 7*b*: when the method of the embodiment of the present invention is performed and one injector is selectively energized, also the drive-line of the motor-vehicle is stimulated; since the band-pass filtering stage 7 may not be implemented with an ideal pass-band characteristic, the said filtering stage will allow more than one order to pass. For this reason, the RMS/MS output C is a fluctuating signal as shown in FIG. 7*b*, rather than a constant one as shown in FIG. 7*a*.

In order to eliminate the effects of the resonance dynamics of the driveline causing the RMS/MS values to oscillate, two further filtering stages 10 and 11 (FIG. 2) are used. The first filtering stage 10 exerts a low-pass filtering action, sample by sample, on the output C of the RMS/MS calculation stage 9. This low-pass filtering stage 10 smoothens as much as possible the fluctuating output C, possibly without introducing an excessive delay.

The second filtering stage 11 performs an amplitude low-pass filtering action on the output D from the first filtering stage 10; the computation carried out by the amplitude low-pass filtering stage 11 is active only when a local maximum or a local minimum is detected, with the aim at providing the mean value of the fluctuating signal C.

The graphs of FIG. 8 and FIG. 9 qualitatively show the outputs D and E from the first low-pass filtering stage 10 and the amplitude low-pass filtering stage 11, respectively. The output E from the amplitude low-pass filtering stage 11 is an estimation of the actual injected fuel quantity.

The graphs in FIG. 10*a*, FIG. 10*b*, and FIG. 10*c* show exemplary time developments of the energizing time ET, the correspondingly injected fuel quantity and the estimations of the injected fuel quantity as achieved by performing the method of an embodiment of the present invention.

The estimations of the actually injected fuel quantity obtained by means of the method of the embodiments of present invention can be used for performing injector-specific corrections by the fuel injection control, in order that the actually injected fuel quantity may tend to equal the desired or nominal one. This in turn allows achieving a reduction of exhaust emissions during the vehicle lifetime, as well as a reduction of combustion noise.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for evaluating the quantity of a fuel with of an electrically controlled fuel injector that is actually injected into a corresponding cylinder of an internal combustion engine, that includes a crankshaft with associated an detector adapted to provide a signal representative of a speed of the crankshaft, the method comprising the steps of:

acquiring a signal while the electrically controlled fuel injector is energized for a predetermined period in which substantially all other fuel injectors are de-energized;

processing the signal so as to data representative of an amplitude of a harmonic component of the signal;

calculating a power value of the harmonic component; and assuming the power value of the harmonic component as an estimation of the quantity of the fuel actually injected by the electrically controlled fuel injector in the predetermined period.

2. The method of claim 1, wherein the internal combustion engine is a 4-stroke internal combustion engine and said harmonic component is a component of an order of about 0.5.

3. The method of claim 1, wherein said processing step comprises the steps of:

filtering the signal with a band-pass filter around a frequency of the harmonic component; and sample-by-sample low-pass filtering to obtain samples from the step of filtering the signal.

4. The method of claim 3, further comprising the step of computing a mean square (MS/RMS) values of the samples after the samples have been subjected to the filtering with the band-pass filter and the sample-by-sample low-pass filtering.

5. The method of claim 4, further comprising the steps of:

sample-by-sample low-pass filtering the mean square (MS/RMS) values; and amplitude low-pass filtering of the mean square (MS/RMS) values.

6. The method of claim 1, wherein the internal combustion engine is a diesel common-rail engine.

7. The method of claim 1, wherein the signal is a crankshaft speed signal.

8. The method of claim 1, wherein the signal is an engine speed signal.

9. A method for controlling a quantity of fuel injected by each fuel injector into a corresponding cylinder of an internal combustion engine, comprising the steps of:

acquiring a signal while a fuel injector is energized for a predetermined period in which substantially all other fuel injectors are de-energized;

processing the signal so as to data representative of an amplitude of a harmonic component of the signal;

calculating a power value of the harmonic component;

assuming the power value of the harmonic component as an estimation of the quantity of fuel actually injected by the fuel injector in the predetermined period; and controlling an energizing time (ET) of the injectors based at least in part on estimations of the quantity of fuel actually injected by each injector.

10. The method of claim 9, wherein the internal combustion engine is a 4-stroke internal combustion engine and said harmonic component is a component of an order of about 0.5.

11. The method of claim 9, wherein said processing step comprises the steps of:

filtering the signal with a band-pass filter around a frequency of the harmonic component; and sample-by-sample low-pass filtering to obtain samples from the step of filtering the signal.

12. The method of claim 11, further comprising the step of computing a mean square (MS/RMS) values of the samples after the samples have been subjected to the filtering with the band-pass filter and the sample-by-sample low-pass filtering.

13. The method of claim 12, further comprising the steps of:

sample-by-sample low-pass filtering the mean square (MS/RMS) values; and amplitude low-pass filtering of the mean square (MS/RMS) values.

14. The method of claim 9, wherein the internal combustion engine is a diesel common-rail engine.

15. The method of claim 9, wherein the signal is a crankshaft speed signal.

16. The method of claim 9, wherein the signal is an engine speed signal.

* * * * *